United States Patent [19]

Smith, Jr. et al.

[11] 4,002,904
[45] Jan. 11, 1977

[54] SIMULTANEOUS THERMAL NEUTRON LIFETIME AND BORON CONTENT WELL LOG

[75] Inventors: Harry D. Smith, Jr.; Ward E. Schultz; Dan M. Arnold, all of Houston, Tex.

[73] Assignee: Texaco Inc., New York, N.Y.

[22] Filed: Dec. 20, 1974

[21] Appl. No.: 534,987

[52] U.S. Cl. .............................. 250/270; 250/252; 250/261; 250/262
[51] Int. Cl.² ........................................ G01V 5/00
[58] Field of Search ........... 250/261, 262, 270, 252

[56] References Cited

UNITED STATES PATENTS

| | | | |
|---|---|---|---|
| 3,402,294 | 9/1968 | Bargainer | 250/270 |
| 3,420,998 | 1/1969 | Mills | 250/262 |
| 3,435,216 | 3/1969 | Givens et al. | 250/262 |

*Primary Examiner*—Harold A. Dixon
*Attorney, Agent, or Firm*—T. H. Whaley; C. G. Ries; William J. Beard

[57] ABSTRACT

A system for logging earth formations traversed by a borehole wherein a high energy pulsed neutron source (14 MeV) repetitively irradiates earth formations. Two time gates operated after each neutron pulse are provided for detecting count rates from which the decay time and the macroscopic capture cross-section $\Sigma$ can be determined. Background gate means are also provided to eliminate the effects of background and detector radiation. In the detection system, output pulses whose voltage level is proportional to the energy detected are produced. A cut-off voltage level is set at approximately 0.8 MeV, which is above the energy of gamma rays produced following neutron capture by the element Boron and below the energy of most gamma rays produced following capture by all other significant formation elements. By comparison of the count rates (obtained by summing these voltage pulses) in a Boron containing formation with macroscopic capture cross-section $\Sigma$ to the count rate in an unborated formation having the same $\Sigma$ value, the concentration of boron can be determined and plotted as a function of depth.

9 Claims, 4 Drawing Figures

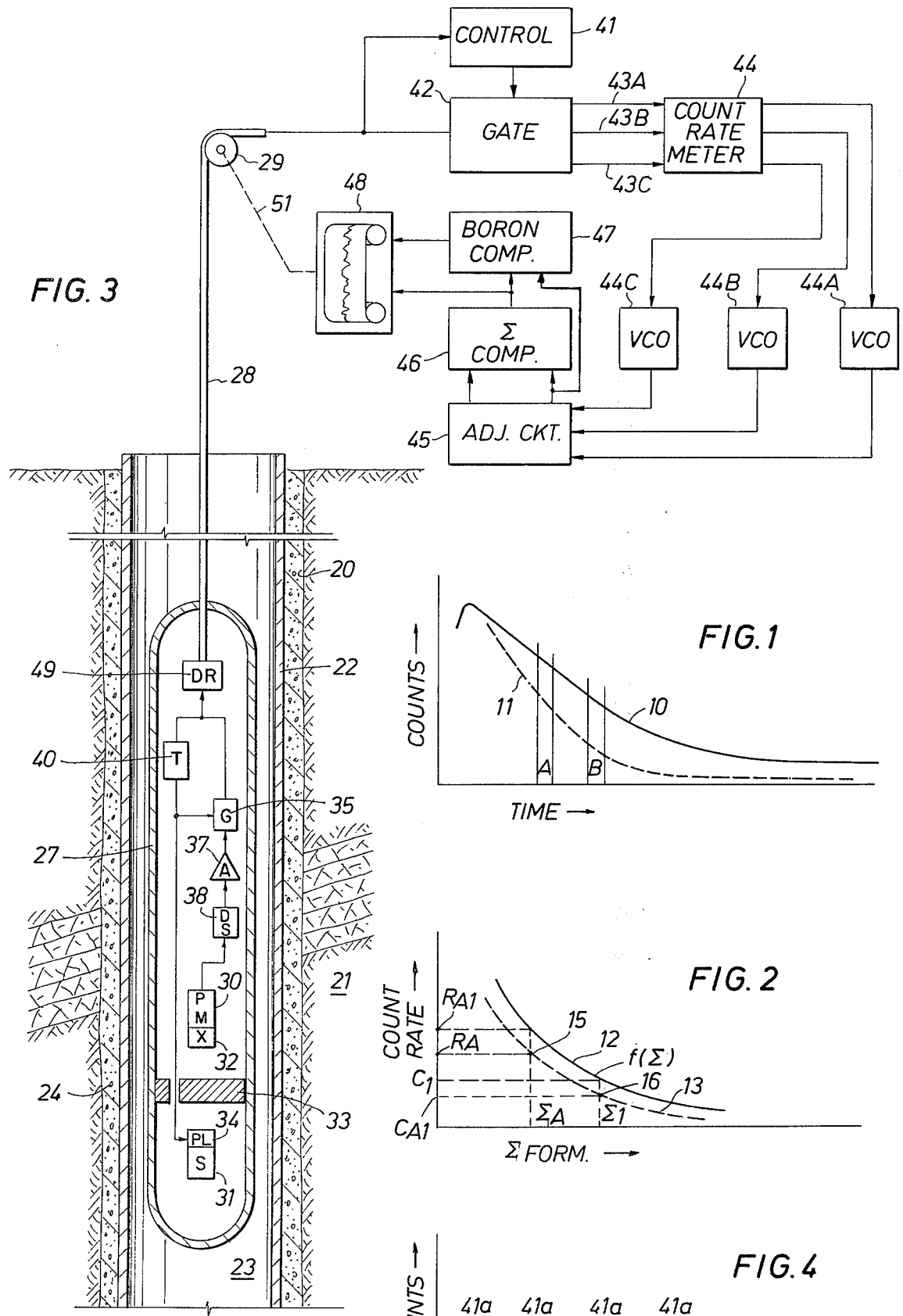

SIMULTANEOUS THERMAL NEUTRON LIFETIME AND BORON CONTENT WELL LOG

FIELD OF THE INVENTION

This invention relates to nuclear well logging for determining characteristics of earth formations traversed by a well bore, and more particularly, to a system for ascertaining the boron content of a formation while also obtaining a thermal neutron lifetime log.

BACKGROUND OF THE INVENTION

In the search for oil and gas bearing formations traversed by a borehole, it is common to make measurements with a logging tool which is moved through the borehole. The type of measurement pertinent to this invention is the intensity of secondary gamma ray radiation developed through neutron irradiation. The measurements are made and recorded as a function of depth and the record produced is called a "log".

It is well known that oil and gas are more likely to be found in commercially recoverable quantities from those earth formations which are relatively porous and permeable than in formations which are more highly compacted or impermeable. It is also known that an oil and gas producing formation may be identified by passing a neutron source through the borehole and measuring the intensity of secondary gamma radiation developed from the neutron irradiation as a function of borehole depth.

In particular, the chlorine nucleus which has a very high thermal neutron capture cross-section, $\Sigma$, (more so than that of the nuclei of other rather commonly found elements) is a good indicator of the location of salt water. Thus, salt water filled limestone or sandstone layers in the earth will have a greater macroscopic thermal neutron capture cross-section than will oil saturated layers. When combined with other porosity information, oil or hydrocarbons can be detected by determining the chlorine content of a formation. This measurement has been observed in the past by measuring either chlorine capture gamma rays or the neutron lifetime (the decay constant of the thermal neutron population) in the earth layer being investigated.

The above mentioned salt water detection techniques have proven to be very useful in the past in locating oil and gas bearing earth formations. However, spurious indications sometimes have been produced by this logging technique due to the fact that boron also has a very high thermal neutron capture cross-section and is commonly found in shales. Hence, there is always some ambiguity in determining if chlorine or boron is the primary cause of increases in observed $\Sigma$ values. An oil bearing zone containing a small shale volume (and hence boron) will have a higher $\Sigma$ value than a clean oil bearing zone, and unless the presence of boron is compensated for, the shaly zone may be misinterpreted as being salt water bearing.

The neutron lifetime or thermal neutron decay time logs which are obtained from the bombardment of the formations with high energy neutrons (14 MeV) represent a measure of the rate of decay of the thermal neutron population. This measurement provides a qualitative indication of the elements in the formation. To determine the rate of thermal neutron population decay at successive fixed times following a neutron burst, electronic gates sample the detector output. The ratio of the detector counts (appropriately corrected for background radiation) is directly related to the macroscopic thermal neutral capture cross-section $\Sigma$. In the detector assembly, the pulse height of the output voltage signal is proportional to the energy of the gamma ray detected.

Boron, when irradiated with thermal neutrons, yields an excited state of lithium which quickly decays to a ground state with the emission of a gamma ray having an energy of about 0.48 MeV. Chlorine, hydrogen, iron, silicon and other formation elements all give off thermal neutron capture gamma rays with energies above 0.48 MeV. The thesis of the present invention is to set a discrimination level for gamma ray energy somewhat above 0.48 mEv to detect thermal neutron capture gamma radiation for substantially all elements except boron.

In the prior art, the above described system uses a cutoff discrimination level of about 2.2 MeV to eliminate the background counts attributable to the neutron activation of the detector crystal and other background radiation effects. Although this level effectively cuts off gamma radiation caused by capture of thermal neutrons by boron, it also cuts off a significant percentage of capture gamma rays from other elements such as calcium, iron and chlorine.

SUMMARY OF THE INVENTION

In the present invention, the system involves a logging tool which is capable of being passed through a well bore and repetitively irradiating earth formations with bursts of high energy neutrons (14 MeV). A detector in the logging tool responds to gamma rays to provide an electrical analog signal with an amplitude which is proportional to the energy of the gamma rays detected. By sampling the counts detected after each neutron burst during two successive time intervals, subtraction of the background radiation, and use of an established relationship of the ratio of these count rates, a capture cross-section value $\Sigma$ can be established. In known, clean (unborated) formations, the measurement of count rates and $\Sigma$'s are used to establish a function, $f(\Sigma)$, based on these parameters. The detector cut-off level is set at about 0.8 MeV so that gamma rays indicative of boron (0.48 MeV) are not counted. Since capture gamma rays from all other significant elements are included, in any clean formation with a given capture cross-section $\Sigma$, virtually the same count rate will be observed for that type of formation. Although multiple gamma rays are emitted following neutron capture with certain formation elements, it has been empirically observed that by judicious choice of upper and lower level detector cut-offs, these differences can be virtually eliminated. Hence, by comparing the count rate $C\alpha$ in a zone of interest having capture cross-section $\Sigma\alpha$ with $f(\Sigma\alpha)$, the difference $f((\Sigma\alpha)-C\alpha)$ can be directly related to the boron content of the unknown zone.

DESCRIPTION OF THE DRAWINGS

FIG. 1 is a plot of count rate verses time for a thermal neutron population decay function of capture gamma rays;

FIG. 2 is a plot of count rate verses capture cross-section for a given unborated formation;

FIG. 3 is a schematic representation of apparatus suitable for practice of the present invention; and FIG. 4 is a schematic representation of a timing function of the operation of the apparatus.

DESCRIPTION OF THE INVENTION

Before describing the process and apparatus embodying the present invention, a review of certain background information will be helpful to clearer understanding of the basis for the present invention. The macroscopic thermal neutron capture cross-section $\Sigma$ of a formation is principally dependent upon formation type and porosity, formation water salinity, formation shale content, and the quantity and type of hydrocarbons contained in the pore spaces. This capture cross-section is proportional to the decay rate of the thermal neutron capture gamma ray population resulting from bursts of high energy neutrons. This decay rate can be effectively measured bu monitoring the gamma ray intensity at two (or more) time intervals following each neutron burst and appropriately correcting the measurements to exclude background radiation. (These time intervals must also be sufficiently removed in time from each neutron burst to eliminate the count rate component from the borehole.)

A plot in FIG. 1 schematically illustrates a decay curve (10) of gamma rays produced by the capture of thermal neutrons as a function of time. At the detector within the sonde, the gamma rays produce electrical pulses with amplitudes proportional to energy. At successive discrete time intervals after each neutron burst, the capture gamma rays are counted during the time gates A and B. The ratio of the count rates in gate A to the count rates in gate B (when corrected for background radiation) are proportional to the capture cross-section $\Sigma$.

Heretofor, an energy cutoff level (obtained by a discriminator) in the detector typically was about 2.2 MeV to eliminate the detector crystal neutron activation background. In such a system all energies below 2.2 MeV are typically discriminated out of the measurements. If curve 10 is considered typical for formations containing salt water, then the dashed curve 11 can be considered typical for formations containing boron. The reduction in count rate is attributable to not recording the boron capture events because their resulting gamma rays have an energy of 0.48 MeV and are below the discriminator level set at 2.2 MeV.

Referring now to FIG. 2, an idealized plot 12 of count rate versus capture cross-section $\Sigma$ is illustrated. The Count rate $C_1$ would be obtained from a clean formation having a cross-section $\Sigma_1$. The curve $f(\Sigma)$ may vary with differences in sonde design, neutron output, etc., but it has been empirically observed that, for many applications, $f(\Sigma)$ can be very closely approximated by the relationship:

$$f(\Sigma) = Ce^{-C_2} \quad (1)$$

where C and $C_2$ are constants.

If curve 12 is taken as typical of an unborated formation, then the dashed curve 13 would be typical of formations containing a given shale fraction (i.e., boron content). In the unborated formations, for an observed value for $\Sigma_1$, the count rate $C_1$ lies on the curve 12 of $f(\Sigma)$.

In a shale (containing boron), the thermal neutron reaction which is responsible for capture gamma rays from the boron in the shale is:

The lithium product decays almost immediately and has an emission line of about 0.48 MeV gamma rays. Other elements which produce capture gamma rays in irradiated formations are:

| Element | Principal Gamma Energies(MeV) |
|---------|-------------------------------|
| H | 2.22 |
| Si | 3.54, 4.93 |
| Ca | 1.94, 2.00, 4.42, 6.41 |
| Cl | 1.17, 1.95, 6.11, 6.64, 7.42, 7.79 |
| Fe | 1.61, 1.73, 5.92, 6.02, 7.64 | if a burst of high energy neutrons (14 MeV) is emitted into known formations which do not contain boron, then the curve 12 of $f(\Sigma)$ as illustrated in FIG. 2, can be established from measurements of the count rate $C_1$ and cross-section $\Sigma_1$. In a shaly formation (A), the observed count rate value $R_A$, at the observed $\Sigma_A$ (point 15 in FIG. 2), will be less than the count rate $R_{A1}$ at the same $\Sigma_A$ because the energy cutoff level prevents the fraction of the neutrons captured by boron from providing observing gamma rays in the discriminated detector output. Note that the presence of boron in shale gives a false indication that the formation contains salt water. By adjusting the energy cut-off level to a value just above 0.48 MeV (about 0.8 MeV), then virtually all capture gamma rays other than those from boron can be counted.

Since the detected count rate from any formation constituent (or reduction in count rate in the case of boron) is directly proportional to the total capture cross-section for that formation constituent, the following approximate relationship for a shaly formation A can be stated:

$$\frac{V_{sh} \cdot \Sigma_{boron}}{\Sigma_A - V_{sh} \cdot \Sigma_{boron}} = \frac{f(\Sigma_A) - R_A}{R_A} \quad (2)$$

where the $$V_{sh} \cdot \Sigma_{boron}$$

is the total capture cross-section for boron.

The $\Sigma_{boron}$ value can be determined from a 100% shale point in the well having $\Sigma = \Sigma_{sh}$ and count rate $R_{sh}$, and a similar relationship can be stated as follows:

$$\frac{\Sigma_{boron}}{\Sigma_{sh} - \Sigma_{boron}} = \frac{f(\Sigma_{sh}) - R_{sh}}{R_{sh}} \quad (3)$$

Combining these equations gives:

$$V_{sh} = \frac{\Sigma_A}{\Sigma_{sh}} \cdot \frac{f(\Sigma_{sh})}{f(\Sigma_A)} \cdot \frac{f(\Sigma_A) - R_A}{f(\Sigma_{sh}) - R_{sh}} \quad (4)$$

Thus, by knowing the shale counting rate $R_{sh}$ and $\Sigma_{sh}$ the shale fraction $V_{sh}$ can be determined by the incorporation of these concepts in the present invention.

Referring initially to FIG. 3, there may be seen a simplified functional representation in the form of a block diagram of well logging apparatus in accordance with the invention. A borehole 20 penetrating earth formations 21 is lined with a steel casing 22 and filled with a well fluid 23. The steel casing 22 is cemented in place by a cement layer 24 which also serves to prevent fluid communication between adjacent producing formations in the earth formations 21.

The downhole portion of the logging system may be seen to be basically composed of an elongated, fluid tight, body member or sonde 27 which, during the logging operation, is passed longitudinally through the casing 22 and is sized for passage therethrough. Surface instrumentation, whose function will be discussed in more detail subsequently, is shown for processing and recording electrical measurements provided by the sonde 27. A well logging cable 28 which passes over a sheave wheel 29 supports the sonde 27 in the borehole and also provides a communication path for electrical signals to and from the surface equipment and the sonde 27. The cable 28 may be of a conventional armored well logging type and may have one or more electrical conductors for transmitting such signals between the sonde 27 and the surface apparatus. It is, however, preferable in the present invention for the well logging cable to be of the triaxial (or armored coaxial) cable of the type shown and described in co-pending patent application entitled "Well Logging System and Method Using An Armored Coaxial Cable and Compensation Circuit", Ser. No. 192,883 (D No. 71,406-1) filed Oct. 27, 1971 and which is assigned to the assignee of the present invention. Such a triaxial cable has desirable bandwidth capabilities of enhancing the measurement and preserving the shape of pulses generated in the downhole equipment.

Again referring to FIG. 3, the sonde 27 contains a source of high energy neutrons 31. The neutron source contemplated for use herein is a pulsed neutron source operating from the principle of the deuterium-tritium reaction. However, it will be understood by those skilled in the art that the invention is not limited thereto. Other types of pulsed neutron sources may be used if desired. A suitable radiation detector comprising a photomultiplier tube 30 and a detector crystal 32 is provided in the sonde 27 for detecting gamma rays resulting from thermal neutron capture reactions with the earth formations 21 surrounding the well borehole 20. A radiation shield 33 of iron, lead or other suitable material is interposed between the neutron accelerator 31 and the detector crystal 32 of the apparatus. The detector crystal 32 may comprise a thallium doped, sodium iodide or cesium iodide or other like activated material which is optically coupled to the photomultiplier tube 30.

The radiation shield 33 reduces the probability of direct irradiation of the detector crystal by neutrons emitted from the pulsed neutron source or accelerator 31. The thermal neutron shield serves to reduce the possibility of thermal neutrons which follow a tortuous path and have been slowed to thermal energies by the borehole fluid 23 or shielding material 33 from reaching the vicinity of the detector crystal and possibly causing neutron activiation of the iodine or other elements comprising the crystal. Moreover, the thermal neutron shield reduces the probability of thermal neutrons from a previous accelerator neutron pulse interacting with the materials within the sonde itself or the detector crystal itself.

As is well known in the art, the scintillation crystal 32 produces a discrete flash of light whenever a gamma ray passes therethrough and exchanges energy with the crystal and lattice work of the crystal. The photomultiplier tube 30 generates a voltage pulse proportional in height to the intensity of each such scintillation which occurs in the crystal 32. The intensity of such scintillations is functionally related to the energy of the gamma ray causing the light flash. Thus, a voltage pulse generated by the photomultiplier tube 30 has an amplitude functionally related to the energy of the corresponding gamma ray. These proportional voltage pulses produced by the photomultiplier tube 30 then comprise a detector signal which is supplied to a linear amplifier 37 via a discriminator 38, if desired. The discriminator 38 may be used to discriminate, for example, against the 0.48 MeV gamma rays emitted by boron in the earth formations 21. The discriminator 38 may also have an upper energy level cut-off. A preset bias level may be used to pass only pulses from the photomultiplier tube 30 exceeding the height corresponding to 0.80 MeV gamma rays. Lower energy gammas due to boron which would otherwise contribute to pulse pile-up are eliminated in this manner.

The neutron accelerator 31 is preferably operated by a pulsing circuit 34 which may be of conventional design as known in the art. The pulsing circuit 34 functions to operate the accelerator 31 in short duration pulses. Pulsing circuit 34 may be controlled by timing pulses from a timing reference or oscillator 40 which can also communicate sync pulses over the cable 28 to the control network 41. For example, the pulsing circuit 34 could be activated by a timing pulse from time reference 40 to emit a neutron burst of a specified time duration. It will be understood, of course, that timing reference 40 could alternatively be located at the surface, if desired. In this event, circuits can be provided in the downhole tool for detecting the timing pulses and using them to control the pulsing circuit. In the thermal neutron decay time measurements contemplated in the present invention, it is desirable to use neutron pulses of about 50 microseconds duration and which are repeated at intervals of about 1000 times per second.

Referring now to FIG. 4, the relative time relationship illustrates the repetitive bursts 41a of high energy neutrons. The bursts occur at 1000 $\mu s$ intervals. At fixed times following each burst 41a, time gates A and B function to detect counts at the detector for discrete time intervals. In the system after 945 consecutive bursts 41a of high energy neutrons, a gate C functions for 50 $ms$ to detect background gamma rays. The count occurring during gate C are scaled to compare to the time that the gates A and B are opened so that the background gamma rays can be subtracted from the gamma ray measurements made during gates A and B.

The thermal neutron capture gamma ray population (curve 10) builds up and reaches a peak only after the cessation of the neutron burst 41a and thereafter decays to a residual or background level. However, some portion of the thermal neutron population is still present from succeeding pulses of neutrons. The background count taken during the gate C time interval is used in the present invention for correcting the gamma ray counts taken during gates A and B to eliminate this thermal neutron activation gamma ray background from the measurements. The neutron pulses 41a should be spaced sufficiently far apart in time so that most of the thermal neutron population (curve 10) has time to decay before the next pulse. The 1000 μs time spacing has been found to be adequate.

Referring again to FIG. 3 and bearing in mind the timing sequence illustrated in FIG. 4, it will be observed that during the time the neutron accelerator 31 is activated, output signals from the photomultiplier tube 30 are conducted via the discriminator 39, a linear amplifier 37 and a gating circuit 35 to a cable driver circuit 49 which may be of conventional design.

Although not depicted in FIG. 3, it will be understood by those skilled in the art that electrical power may be supplied from a surface power source (not shown) via the well logging cable 28 to the downhole sonde 27. Suitable power supplies (not shown) are provided in the sonde for powering the downhole portion of the equipment.

The output signals supplied on cable 28 by the downhole equipment comprise a sequence of voltage pulses resulting from the gamma rays detected the the downhole detector crystal 32. The pulse signals comprise a combination of background and capture gamma rays from the formation primarily due to the thermal neutron gamma rays previously discussed. In the surface equipment, an accurate estimate of these background gamma rays is provided by the gamma ray count occurring during the time of gate C (which can be scaled to the same time duration as gate A and gate B, but which occurs just once during a one second time interval). Greater detail of the system and technique for eliminating background gamma rays from the measurements may be found by reference to U.S. Pat. No. 3,842,264. Briefly, however, in this system, the surface equipment includes a control network 41 which receives all the sync signals from the downhole equipment and provides a switching function in response to sync pulses generated by the downhole control circuit 40. The pulse gamma ray signals from downhole are supplied to a gate circuit 42 which routes the pulses into one of the appropriate channels 43(a–c). A count rate meter means 44 receives the pulses from channels 43(a–c) and generates proportional output voltages which are supplied to voltage controlled oscillators 44(a–c). The oscillators 44(a–c) respectively supplied to an adjustment circuit 45 where the background counts from gate C are scaled and deducted from the background counts of gates A and B. The outputs of the adjustment circuit 45 are supplied to a Σ computer 46 which computes the Σ value from the time gates A and B. The output from the Σ computer 46 is supplied to a boron computer 47 and to a recorder 48. The boron computer 47 compares the count rates and the Σ value for gates A and B relative to the count rates and the Σ for an unborated formation and provides an output indicative of the boron content. The output indicative of boron content is supplied to the recorder 48. The recorder 48 and well tool 27 are mechanically connected by electrical or mechanical linkage means 51 so that the values can be plotted as a function of depth on a log. This technique for depth logging is well known in the art.

The beginning of an operating cycle of the apparatus may be thought of as commencing with the counting of bursts 41. With each burst of energy, a sync pulse occurs and is counted. For a 1 KHz frequency the bursts occur each 1000 μs. Following each burst, the gates A and B in gate 42 are opened and pulse signals from the downhole tool which fall within the energy window (above 0.80 MeV and below the upper cut-off level) pass therethrough and are ultimately supplied in digital form to the adjustment circuit 45.

In the downhole control network 40, when 945 consecutive pulses representative of successive neutron bursts are counted therein, a different sync pulse is supplied to the surface control network 41 and to the gate 35. Thereafter, the gate C of gate 42 is opened for a 50 ms time interval while the generator 31 is inactive. At the time when a 1000th pulse would occur, the system reverts to counting consecutive pulses for the "A" and "B" gating period. The adjustment circuit 45 adjusts or scales the background count during the time of gate C to a time period equal to the cummulative time of the sampling gates A and B during a one second period.

The output of the adjustment circuit 45 is supplied to a Σ computer 46 (FIG. 3) which supplies an output of Σ values to the boron computer 47 and to the recorder 48. The boron computer 47 measures the difference in count rates for the then measured Σ and a previously measured Σ value ascertained for an unborated formation, as discussed previously with respect to FIG. 2.

In the practice of the invention, the tool 27 is located adjacent a formation known to be unborated. From the observed count rates supplies to the computer 46 and the corresponding Σ values for the two time gates A and B (less the background of gate C) a function of Σ (curve 12) can be derived and stored in the boron computer 47. This function and values are retained in the computer 47 as a comparison memory data bank. The tool 27 is then passed through the well bore and the subsequent measurements of count rates and Σ values are constantly compared to the data bank values in the computer 47. Whenever a difference in count rate occurs for a given Σ value, a signal related to this difference value is output to the recorder 48 as a boron value. For example, in FIG. 2, the values of Σ and Count Rate which define the curve 12 might be input to the memory bank of computer 47 as an unborated formation. Subsequently, when the tool is moved adjacent to another formation for a given value $\Sigma_1$ (as determined by the ratio of count rates for gates A and B and corrected for the count rate of gate C), the count rate $C_{A1}$ (point 16) is supplied to the computer 47 where it is compared to the count rate value $C_1$ and a difference signal is output to the recorder 48 for recording. Thus, the recorder simultaneously produces a log of boron content and a log of thermal neutron capture cross-section so that shaly zones containing boron can be distinguished from permeable salt water containing formations.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A method for logging earth formations traversed by a well bore comprising the steps of:
  repetitively irradiating earth formations known to be substantially free of boron content with high energy neutrons and developing values of thermal neutron capture gamma ray count rates for defining the function $f(\Sigma)$ (where $\Sigma$ is the macroscopic capture cross-section for thermal neutrons) for values of Σ and the thermal neutron capture gamma ray count rates;

for another section of the borehole, repetitively irradiating the earth formations over the length of such section with high energy neutrons and developing values from the thermal neutron capture gamma ray count rate of Σ and corresponding thermal neutron capture gamma ray count rates, where said gamma ray count rates include all gamma ray energies in excess of 0.8 MEV;

comparing, for discrete locations along such section the relative values of developed gamma ray count rates for selected Σ values to said function $f(\Sigma)$; and producing indications whenever the measured values of count rates and count rates derived from said function $f(\Sigma)$ differ as an indication of the presence of boron.

2. The method as defined in claim 1 wherein said values for defining Σ and count rates for in situ earth formations which are free of boron content are stored in a memory means.

3. The method as defined in claim 2 wherein said thermal neutron capture gamma ray count rates for gamma ray energies in excess of 0.8 MEV are compared in said memory means for a given Σ value and differences therebetween are represented by output signals from said memory means, and recording said output signals as a function of depth simultaneous with recording of said Σ values for said sections of borehole.

4. The method as defined in claim 3 where said step of irradiating the earth formations includes repetitive generation of bursts of neutrons having energies of about 14 MEV.

5. The method as defined in claim 4 wherein said values of thermal neutron capture gamma ray count rates are developed during two successive discrete time intervals following each burst and ratios of said count rate values are developed for defining Σ values.

6. The method as defined in claim 5 wherein said values of thermal neutron capture gamma ray count rates are corrected with respect to background gamma ray count rates where said background count rates are sampled only once for a plurality of neutron bursts.

7. A method of logging earth formations traversed by a well bore comprising the steps of:

locating a high energy neutron generating well tool in a well bore at a location known to be relatively boron free;

calibrating the thermal neutron capture gamma ray response to said high energy neutron generation to establish a function $f(\Sigma)$ (where Σ is the formation macroscopic capture cross-section for thermal neutrons) for such boron free formations;

logging the earth formations with said well tool and detecting thermal neutron capture gamma ray response with gamma ray energies above 0.8 MEV;

detecting and counting during a time cycle including repetitive bursts of high energy neutrons, for each such burst, thermal neutron capture gamma rays at successive discrete time periods and, for each time cycle, discontinuing such neutron bursts for a short time period and during such time period detecting and counting background gamma rays;

compensating said thermal neutron capture gamma ray counts for such successive time intervals by subtracting appropriately scaled background gamma ray counts therefrom;

deriving gamma ray count rates from said compensated gamma ray counts;

deriving macroscopic thermal neutron capture cross-section values Σ from said count rates;

comparing said derived capture cross-section values and count rates Σ with a predetermined function $f(\Sigma)$ which is representative of the thermal neutron capture gamma ray count rate expressed as a function of the macroscopic cross section in a known unborated formation;

for each such comparison of derived capture cross-section values Σ with a corresponding capture cross-section value Σ of said predetermined function $f(\Sigma)$, deriving the difference in derived gamma ray count rates from a corresponding count rate from said function for providing an output indication of the boron content of such logged formations; and plotting such output indications as a function of depth in the well bore.

8. The method as defined in claim 7 and further including the step of deriving a Σ output indication from said derived macroscopic capture cross-section values Σ and plotting such Σ output indications as a function of depth.

9. The method as defined in claim 8 wherein said time cycle is one second.

* * * * *